United States Patent
Abry et al.

(10) Patent No.: US 6,669,874 B1
(45) Date of Patent: Dec. 30, 2003

(54) METHOD FOR PRODUCTION OF AND MATERIAL ADAPTED TO BE SINTERED TO A NUCLEAR FUEL ELEMENT WITH OXIDE BASE

(75) Inventors: Philippe Abry, Västerås (SE); Sten Borell, Västerås (SE); Sven Eriksson, Skultuna (SE)

(73) Assignee: Westinghouse Atom AB, Västerås (SE)

( * ) Notice: Subject to any disclaimer, the term of this patent is extended or adjusted under 35 U.S.C. 154(b) by 0 days.

(21) Appl. No.: 09/913,165

(22) PCT Filed: Feb. 8, 2000

(86) PCT No.: PCT/SE00/00237

§ 371 (c)(1),
(2), (4) Date: Feb. 21, 2002

(87) PCT Pub. No.: WO00/49621

PCT Pub. Date: Aug. 24, 2000

(30) Foreign Application Priority Data

Feb. 19, 1999 (SE) ................................................ 9900605

(51) Int. Cl.$^7$ ................................................ G21C 3/58
(52) U.S. Cl. ........................ 252/636; 264/0.5; 376/409; 376/421; 376/901
(58) Field of Search ................................. 252/636, 638; 376/409, 421, 901; 264/0.5

(56) References Cited

U.S. PATENT DOCUMENTS

| | | | | | |
|---|---|---|---|---|---|
| 3,663,182 | A | * | 5/1972 | Hamling | 442/181 |
| 3,923,933 | A | * | 12/1975 | Lay | 264/5 |
| 4,460,522 | A | * | 7/1984 | Kinugasa et al. | 264/5 |
| 4,869,866 | A | * | 9/1989 | Lay et al. | 376/421 |
| 4,869,867 | A | * | 9/1989 | Lay et al. | 376/421 |
| 4,869,868 | A | * | 9/1989 | Lay et al. | 376/421 |
| 5,268,947 | A | * | 12/1993 | Bastide et al. | 376/422 |
| 5,762,831 | A | * | 6/1998 | Viallard et al. | 252/638 |
| 5,894,501 | A | | 4/1999 | Doerr et al. | 376/409 |
| 5,978,431 | A | * | 11/1999 | Edwards | 376/261 |
| 6,235,223 | B1 | * | 5/2001 | Doerr et al. | 264/5 |

FOREIGN PATENT DOCUMENTS

| | | |
|---|---|---|
| DE | 19627806 | 1/1998 |
| GB | 1334391 | 10/1993 |
| WO | 97/06535 | 2/1997 |

\* cited by examiner

*Primary Examiner*—Margaret Medley
(74) *Attorney, Agent, or Firm*—Swidler Berlin Shereff Friedman, LLP

(57) ABSTRACT

A method for production of a nuclear fuel element with oxide base, in which the nuclear fuel with oxide base is mixed with Cr and sintered to a solid body. The amount of chrome oxide added is =>50 and <100 ppm with respect to the amount of nuclear fuel with oxide base added.

17 Claims, No Drawings

is obtained by means of a material of the type

METHOD FOR PRODUCTION OF AND MATERIAL ADAPTED TO BE SINTERED TO A NUCLEAR FUEL ELEMENT WITH OXIDE BASE

BACKGROUND OF THE INVENTION AND PRIOR ART

This application is a 371 of PCT/SE00/00237 filed Feb. 8, 2000.

The present invention relates to a method for production of a nuclear fuel element with oxide base, in which the nuclear fuel with oxide base is mixed with chrome oxide and sintered into a solid body. The invention also relates to a material with oxide-based adapted to be sintered to a nuclear fuel element, which comprises a nuclear fuel with oxide base and chrome oxide.

Methods and materials of the type mentioned above are already known within the field of nuclear energy applications. The nuclear fuel with oxide base may comprise $UO_2$, $ThO_2$, $PuO_2$ or a mixture thereof, and is provided as powder.

Different editions of further oxides, such as $TiO_2$, $Nb_2O_5$, $Cr_2O_3$, $Al_2O_3$, $V_2O_5$ and MgO have according to the prior art been added to the nuclear fuel with oxide base for obtaining an increase of the grain size thereof in connection with the sintering thereof, since said additions activate the crystalline growth of the grains of the nuclear fuel during the sintering.

The increased grain size results in a need of a longer time for gas enclosures in the grains to diffuse to grain boundaries and through these out of the nuclear fuel when this is used during operation. The amount of such gases, fission gases, outside the nuclear fuel element is accordingly reduced during normal operation conditions thanks to the increased grain size of the nuclear fuel.

It may also be assumed that an increased corrosion resistance results from an increased grain size of the nuclear fuel, since corrosion preferably starts at the grain boundaries and the relationship between the total grain boundary area and the volume of a nuclear fuel element is reduced, i.e. the total grain boundary area is reduced, when the grain size increases. A good corrosion resistance is desired, since the nuclear fuel may come into contact with steam or water during the operation as consequence of damage on a surrounding cladding tube. Corrosion products may then be spread further out in the plant, which should be avoided for reasons known per se.

Besides the fact that the additions mentioned above result in a larger grain size of the nuclear fuel and the advantages associated therewith, at least some of them contribute to an increase of the density of the nuclear fuel element, with respect to the weight of the very nuclear fuel, for example U, Th or Pu, in relation to the volume of the nuclear fuel element. Thus, more power may be obtained out of a given volume of the nuclear fuel.

At least some of said additions also result in an increase of the plasticity of the nuclear fuel element sintered. This results in a smaller risk of damage on surrounding cladding tubes at rapid power increases during operation, and volume changes of the nuclear fuel element associated therewith, since the fuel element with less power than otherwise acts on the cladding tube.

$Cr_2O_3$ is the addition of those mentioned above that gives the mostly noticeable result. The prior art uses therefor preferably $Cr_2O_3$ for obtaining the effects mentioned above, primarily the increase of the grain size of the nuclear fuel. However, $Cr_2O_3$ has to be considered as a poison in this context, since Cr has a comparatively large neutron absorption cross section, which in its turn may have a negative influence upon the power of the nuclear fuel element, which has been understood by the applicant. According to the prior art 1000–5000 ppm Cr is added (separate or as $Cr_2O_3$) with respect to the amount of the nuclear fuel with oxide base, for example $UO_2$, for obtaining the effects mentioned above.

SUMMARY OF THE INVENTION

An object of the present invention is to provide a method which benefits by the effects obtainable through addition of a further oxide, preferably chrome oxide to the nuclear fuel with oxide base at the same time as the amount of chrome oxide added is regulated while considering the negative consequences of the presence of Cr in the nuclear fuel element.

The method defined in the introduction is for obtaining this object characterized in that the amount of Cr added is $\geq 50$ ppm and $<1000$ ppm with respect to the amount of nuclear fuel with oxide base added. Such amounts of added chrome oxide result in remarkably increased grain sizes of different nuclear fuels with oxide base, such as $UO_2$ in connection with the sintering of the nuclear fuel element, at the same time as the amount of Cr is kept at a lower level than before, and has accordingly a reduced negative influence upon the efficiency of the nuclear fuel element during operation, in spite of the comparatively high neutron absorption cross section thereof. A still more preferred interval with respect to the amount of Cr is 100–700 ppm.

According to a preferred embodiment of the method a powder comprising at least one further metal oxide is also added, the metal of which has a substantially smaller neutron absorption cross section than Cr, to such an amount that it contributes noticeably to a grain enlarging effect of the chrome oxide upon the nuclear fuel at the sintering. The further metal oxide is preferably any of $Nb_2O_5$, $Al_2O_3$ and MgO. Said additions are alone or in combination with each other insufficient for obtaining the effects obtained by the chrome oxide, but they function excellent as supplements to the chrome oxide. The chrome oxide is preferably $Cr_2O_3$.

According to a further preferred embodiment of the method the further metal oxide comprises $Al_2O_3$ and the amount of Al added is $\geq 20$, and preferably $\leq 300$ ppm. Below 20 ppm the effect of $Al_2O_3$ added is rapidly reduced. Above 300 ppm the further positive effects of $Al_2O_3$ get marginal with the chrome oxide proportion in question.

According to a further preferred embodiment of the method the further metal oxide comprises MgO, in which the amount of Mg added is $\geq 20$, and preferably $\leq 300$ ppm. Below 20 ppm the positive effects of MgO upon the nuclear fuel with oxide base are reduced rapidly. Above 300 ppm Mg the further positive effects of MgO gets marginal with the chrome oxide proportion in question.

A further object of the invention is to provide a material with oxide base adapted to be sintered to a nuclear fuel element, which through a content of chrome oxide determined in advance and as a result of the composition thereof gets the advantages in the form of higher density, larger nuclear fuel grains and better plasticity resulting from the additions of said further oxides mentioned in the introduction, at the same time as a neutron absorption cross section being as low as possible is obtained for the nuclear fuel element.

This object is obtained by means of a material of the type defined in the introduction, which is characterized in that the amount Cr is ≧50 ppm and <1000 ppm with respect to the amount of nuclear fuel with oxide base.

According to a preferred embodiment the material with oxide base comprises also at least one further metal oxide, the metal of which has a substantially smaller neutron absorption cross section than Cr and is present in such an amount that it contributes noticeably to the grain enlarging effect of the chrome oxide upon the nuclear fuel with oxide base at a sintering of the material. A further metal oxide may be any of $Nb_2O_5$, $Al_2O_3$ and MgO already mentioned. Presence of several of these oxides jointly is also possible in the material. The further metal oxide or oxides has a supplementary object with respect to the chrome oxide, without increasing the total neutron absorption cross section of the nuclear fuel element noticeably.

According to a further preferred embodiment said metal oxide comprises aluminium oxide in the form of $Al_2O_3$, in which the amount is ≧20, and preferably ≦300 ppm with respect to the amount nuclear fuel. Below 20 ppm the effects of $Al_2O_3$ added are reduced. Above 300 ppm Al the further positive effects of $Al_2O_3$ gets marginal with the chrome oxide proportion in question.

According to a further preferred embodiment the metal oxide comprises magnesium oxide in the form of MgO, in which the amount Mg is ≧20, and preferably ≦300 ppm with respect to the amount nuclear fuel. The amount MgO is restricted for the same reasons as for $Al_2O_3$.

Further advantages and features of the method and the material according to the invention will appear from the detailed description following and the other dependent claims.

DETAILED DESCRIPTION OF AN EMBODIMENT

According to a preferred embodiment of the method according to the invention one or a plurality of powders comprising $Cr_2O_3$, $Al_2O_3$ and MgO is added to a powder comprising a nuclear fuel with oxide base, in this case $UO_2$.

The amount $Cr_2O_3$ added, where Cr is in the interval 50–1000 ppm (weight proportions with respect to the weight of $UO_2$), the amount Al added in the form of $Al_2O_3$ is in the interval 20–300 ppm and the amount Mg added in the form of MgO is in the interval 20–300 ppm. An adhesive and a lubricant are added separately or as a part of any of said powders as already known per se.

The powders are then mixed in any way known per se so that a homogenous mixture is obtained.

The homogenous powder mixture is then pressed into one or several green bodies, by a pressure of 200–700 MPa.

The green body or bodies are then sintered in a hydrogen atmosphere with an addition of 0.1–0.5% of $CO_2$, as an alternative only in humidified hydrogen without an addition of $CO_2$. The sintering lasts for 1–6 hours at a temperature of 1400–1800° C. and under atmospheric pressure. A density very close to the theoretical density is obtained thereby. The $UO_2$ grains, which at the beginning had a grain size on the order of 10 μm, have during the sintering grown to ≧25 μm, i.e. they have become considerably larger.

The oxides $Cr_2O_3$, $Al_2O_3$ and MgO added have during the sintering formed a liquid phase which in the material sintered and cooled, i.e. the fuel element formed, forms the matrix around the $UO_2$-particles present in the sintered body.

Variations of the preferred embodiment described will of course be apparent to a man skilled in the art, but he will then not go around the scope of protection defined by the appended claims with support by the description of the invention.

The method and the material according to the invention are well suited for production of nuclear fuel elements in the form of fuel pellets, which are positioned in cladding tubes and are used in compressed-water reactors and boiling water reactors for extraction of nuclear energy through nuclear fission activated by neutron irradiation.

It has to be pointed out that the ppm values mentioned relate to weight metal/weight nuclear fuel with oxide base, for example weight Cr/weight $UO_2$.

What is claimed is:

1. A method for producing an oxide-based nuclear fuel element, the method comprising:

mixing the oxide-based fuel with chrome oxide in the form of $Cr_2O_3$ in an amount between ≧50 ppm and <1000 ppm with respect to the amount of oxide-based fuel;

mixing the oxide-based fuel and chrome oxide with at least one further metal oxide, wherein the metal in the metal oxide has a substantially smaller neutron absorption cross section than Cr, wherein the amount of the at least one further metal oxide added noticeably contributes to a grain enlarging effect of chrome oxide on the nuclear fuel during sintering; and sintering the mixed oxide-based fuel, the further metal oxide and the chrome oxide to form a solid body.

2. The method according to claim 1, wherein the further metal oxide comprises aluminium oxide.

3. The method according to claim 2, wherein the aluminum oxide comprises $Al_2O_3$, and wherein the amount of Al is ≧20 ppm with respect to the amount of oxide-based fuel.

4. The method according to claim 2, wherein the aluminum oxide comprises $Al_2O_3$, and wherein the amount of Al is ≦300 ppm with respect to the amount of oxide-based fuel.

5. The method according to claim 1, wherein the further metal oxide comprises magnesium oxide.

6. The method according to claim 5, wherein the magnesium oxide comprises MgO and wherein the amount of Mg added is ≧20 ppm.

7. The method according to claim 5, wherein the magnesium oxide comprises MgO and wherein the amount of Mg added is ≦300 ppm.

8. The method according to claim 1, wherein the sintering is carried out at a temperature at which the chrome oxide and the further metal oxide form a liquid phase which after the sintering forms a matrix between particles of the oxide-based nuclear fuel.

9. The method according to claim 1, wherein the oxide-based nuclear fuel comprises at least one of the oxides $UO_2$, $ThO_2$ and $PuO_2$.

10. An oxide-based material adapted to be sintered to a nuclear fuel element, comprising:

an oxide-based nuclear fuel;

chrome oxide in the form of $Cr_2O_3$ wherein the amount of Cr is between ≧50 ppm and ≦1000 ppm with respect to the amount of the oxide-based nuclear fuel; and at least one further metal oxide comprising a metal having a substantially smaller neutron absorption cross section than Cr and being present in such an amount that it contributes noticeably to a grain enlarging effect of chrome oxide upon the oxide-based nuclear fuel at the sintering of the material.

11. The material according to claim 10, wherein the further metal oxide comprises aluminium oxide.

12. The material according to claim 11, wherein the aluminum oxide comprises $Al_2O_3$, and wherein the amount of Al is ≧20 ppm with respect to the amount of oxide-based fuel.

13. The material according to claim 11, wherein the aluminum oxide comprises $Al_2O_3$, and wherein the amount of Al is $\leq 300$ ppm with respect to the amount of oxide-based fuel.

14. The material according to claim 10, wherein the further metal oxide comprises magnesium oxide.

15. The material according to claim 14, wherein the magnesium oxide comprises MgO and wherein the amount of Mg added is $\geq 20$ ppm.

16. The material according to claim 14, wherein the magnesium oxide comprises MgO and wherein the amount of Mg added is $\leq 300$ ppm.

17. The material according to claim 10, wherein the oxide-based nuclear fuel comprises at least one of the oxides $UO_2$, $ThO_2$ and $PuO_2$.

* * * * *